(12) United States Patent
Zhang

(10) Patent No.: US 12,706,628 B2
(45) Date of Patent: Aug. 11, 2026

(54) PROTECTIVE CASE FOR ELECTRONIC DEVICE AND PROTECTIVE CASE MANUFACTURING METHOD

(71) Applicant: Shenzhen Zhangla Innovation Technology Co., LTD., Shenzhen (CN)

(72) Inventor: Bo Zhang, Shenzhen (CN)

(73) Assignee: Shenzhen Zhangla Innovation Technology Co., LTD., Shenzhen (CN)

( * ) Notice: Subject to any disclaimer, the term of this patent is extended or adjusted under 35 U.S.C. 154(b) by 294 days.

(21) Appl. No.: 18/522,229

(22) Filed: Nov. 29, 2023

(65) Prior Publication Data

US 2024/0097732 A1 Mar. 21, 2024

Related U.S. Application Data

(63) Continuation of application No. PCT/CN2023/090281, filed on Apr. 24, 2023.

(30) Foreign Application Priority Data

Jul. 21, 2022 (CN) ......................... 202210864119.8

(51) Int. Cl.
*H04B 1/3888* (2015.01)

(52) U.S. Cl.
CPC .................................. *H04B 1/3888* (2013.01)

(58) Field of Classification Search
CPC ........... A45C 2011/002; H04B 1/3888; H04M 1/0214; H04M 1/0283; H04M 1/18
See application file for complete search history.

(56) References Cited

U.S. PATENT DOCUMENTS

| | | | | |
|---|---|---|---|---|
| 9,223,346 | B2 * | 12/2015 | Wilson | G06F 1/1626 |
| 9,432,074 | B2 * | 8/2016 | Fathollahi | B29C 45/14631 |
| 9,872,546 | B2 * | 1/2018 | Kim | A45C 13/36 |
| 9,882,596 | B2 * | 1/2018 | Flores | G06F 1/1626 |
| 11,522,571 | B2 * | 12/2022 | Ng | H04B 1/3888 |

(Continued)

FOREIGN PATENT DOCUMENTS

| | | |
|---|---|---|
| CN | 212590788 | 2/2021 |
| CN | 212992392 | 4/2021 |

(Continued)

OTHER PUBLICATIONS

"International Search Report (Form PCT/ISA/210) of PCT/CN2023/090281," mailed on Aug. 7, 2023, pp. 1-3.

(Continued)

*Primary Examiner* — Un C Cho
(74) *Attorney, Agent, or Firm* — Bay State IP, LLC

(57) ABSTRACT

Embodiments of the present disclosure relate to a protective case for an electronic device and a protective case manufacturing method. The protective case includes: a first structure, having a bezel inner surface and a bezel outer surface, where the bezel inner surface encloses a space suitable for accommodating the electronic device; and at least one second structure, attached to the first structure, where the second structure extends along the bezel outer surface and has an airbag inner surface and an airbag outer surface, and the airbag inner surface is disposed opposite to the bezel inner surface, to form at least one airbag between them.

13 Claims, 7 Drawing Sheets

(56) References Cited

U.S. PATENT DOCUMENTS

| | | | | |
|---|---|---|---|---|
| 2013/0146491 | A1* | 6/2013 | Ghali | G06F 1/1626 53/472 |
| 2014/0221056 | A1* | 8/2014 | Gandhi | H04B 1/3888 455/575.8 |
| 2015/0061477 | A1* | 3/2015 | Wilson | H04B 1/3888 312/223.1 |
| 2017/0179994 | A1* | 6/2017 | Poon | H04M 1/04 |
| 2022/0094383 | A1* | 3/2022 | Zhang | A45C 13/04 |

FOREIGN PATENT DOCUMENTS

| | | |
|---|---|---|
| CN | 214205641 | 9/2021 |
| CN | 113520003 | 10/2021 |
| CN | 216122530 | 3/2022 |
| CN | 217771680 | 11/2022 |

OTHER PUBLICATIONS

"Written Opinion of the International Searching Authority (Form PCT/ISA/237) of PCT/CN2023/090281," mailed on Aug. 7, 2023, pp. 1-4.

* cited by examiner

PROTECTIVE CASE FOR ELECTRONIC DEVICE AND PROTECTIVE CASE MANUFACTURING METHOD

CROSS-REFERENCE TO RELATED APPLICATION

This application is a continuation of international PCT application serial no. PCT/CN2023/090281, filed on Apr. 24, 2023, which claims the priority benefit of China application no. 202210864119.8, filed on Jul. 21, 2022. The entirety of each of the above mentioned patent applications is hereby incorporated by reference herein and made a part of this specification.

TECHNICAL FIELD

Embodiments of the present disclosure mainly relate to the field of accessories of electronic devices, and in particular, to a protective case for an electronic device and a protective case manufacturing method.

BACKGROUND

Portable electronic devices such as a mobile phone and a tablet computer are widely used in daily life. In daily use, an electronic device, especially a screen and a housing, is easily damaged due to falling off. Therefore, a protective case is usually sleeved on an outer side of the electronic device. The protective case provided for the electronic device can implement good anti-fall and anti-wear functions.

Housings of some conventional protective cases are thinned locally to form recesses. A relatively enclosed space is formed between an outer surface of an electronic device and the protective case, and deformation is generated when an external force is applied, thereby implementing shock absorption and anti-fall, and protecting the device. Such a protective case can provide shock absorption and protection for only a local region of the electronic device, and the region under protection is limited. In addition, a limited protection effect is provided due to a limited size and a limited layout position of the recess.

Another conventional protective case includes a protective airbag. However, a structure of the protective airbag is complex. For example, a protective case with an anti-fall function is disclosed in CN214205641U, where a mounting groove suitable for accommodating an airbag body is disposed on a housing of the protective case. To prevent damage to an airbag structure in a process of forming a protective case through injection molding, a structure of the protective case is extremely complex and the airbag structure is disposed at only a corner part of the protective case. Consequently, manufacturing costs of the protective case are high and a protection effect is limited. In particular, only four corners can be protected, and edges on sides of an electronic device cannot be protected.

Therefore, a conventional protective case needs to be further improved.

SUMMARY

According to example embodiments of the present disclosure, a protective case for an electronic device and a protective case manufacturing method are provided, to resolve or at least partially resolve one or more of the foregoing problems.

According to a first aspect of the present disclosure, a protective case for an electronic device is provided. The protective case includes: a first structure, having a bezel inner surface and a bezel outer surface, where the bezel inner surface encloses a space suitable for accommodating the electronic device; and at least one second structure, attached to the first structure, where the second structure extends along the bezel outer surface and has an airbag inner surface and an airbag outer surface, and the airbag inner surface is disposed opposite to the bezel inner surface, to form at least one airbag between the airbag inner surface and the bezel outer surface. In this manner, the airbag is formed by combining two structures, to implement an airbag with a large area, thereby simplifying a structure of the protective case and reducing manufacturing costs.

In some embodiments, the first structure is made of a first material having first hardness, the second structure is made of a second material having second hardness, and the first hardness is greater than the second hardness. In this way, the first structure can provide sufficient rigidity, and the second structure has sufficient flexibility, thereby implementing an enhanced impact absorption effect.

In some embodiments, one of the first structure and the second structure includes flanges that protrusively extend, the other of the first structure and the second structure includes assembly parts, and the flanges fit with the assembly parts in shape to maintain the first structure and the second structure together. In this way, the first structure and the second structure can be joint together in a simple manner.

In some embodiments, the flanges include a plurality of flanges extending along the bezel outer surface and protruding from the bezel outer surface, and the plurality of flanges are spaced from each other and form the airbag together with the airbag inner surface and the bezel outer surface. In this way, a space for the airbag can be effectively and conveniently enlarged by using the flanges without increasing structural complexity. In addition, when a third structure is disposed, the flanges have advantages such as providing rigid support in a process of forming the protective case.

In some embodiments, the flange vertically or obliquely extends relative to the bezel outer surface when observed from a cross section of the airbag, so that a right angle or an obtuse angle is formed between the flange and the bezel inner surface forming the airbag. In this way, an impact force can be withstood by using the flanges and then by using the first structure.

In some embodiments, the protective case further includes a third structure, and the first structure and the at least one second structure are joint together by using the third structure. Structural strength of the first structure and the second structure can be significantly improved by using the third structure, and aesthetic can be improved. In addition, it may be convenient to dispose an interface function region on the third structure.

In some embodiments, the first structure includes a bottom wall and a bezel wall extending from the bottom wall, and the bezel wall includes the bezel inner surface and the bezel outer surface. In this way, a large region of the electronic device can be covered and protected.

In some embodiments, the first structure and the second structure form a first notch at the bottom wall and a second notch at an opening of the space, and the third structure is configured to fill the first notch and the second notch. Therefore, complexity of a manufacturing mold can be simplified through two-sided coverage molding, thereby reducing manufacturing costs.

In some embodiments, the third structure includes a joint edge extending towards the space from the second notch and beyond the bezel wall, and the joint edge is configured to join with an edge of the electronic device. In this way, even if the airbag is disposed in the protective case, the protective case can also be clamped with the electronic device in a simple manner.

In some embodiments, the third structure is an injection-molded member when the first structure and the at least one second structure are assembled together. In this way, the third structure can be conveniently formed, and integrity of components of the protective case can be ensured.

In some embodiments, the third structure further includes interface regions suitable for operating the electronic device.

In some embodiments, the at least one airbag further includes a plurality of elastomer particles accommodated in the at least one airbag; or the at least one airbag further includes liquid and/or colloid filled in the airbag. A shock absorption effect of the protective case can be further enhanced by accommodating the plurality of elastomer particles or the liquid and/or the colloid in the airbag. In addition, aesthetic of the protective case can be further enhanced.

According to a second aspect of the present disclosure, a protective case manufacturing method is provided. The method includes:

- forming a first structure through injection molding, where the first structure has a bezel inner surface and a bezel outer surface, and the bezel inner surface encloses a space suitable for accommodating an electronic device;
- forming at least one second structure through injection molding, where the second structure extends along the bezel outer surface and has an airbag inner surface and an airbag outer surface;
- assembling the first structure and the at least one second structure together, so that the airbag inner surface is disposed opposite to the bezel inner surface, to form at least one airbag between the airbag inner surface and the bezel outer surface; and
- forming a third structure through injection molding when the first structure and the at least one second structure are assembled together, so that the first structure and the at least one second structure are joint together by using the third structure.

In some embodiments, the first structure is formed through injection molding by using a first mold, the at least one second structure is formed through injection molding by using a second mold, and the third structure is formed through injection molding by using a third mold when the first structure and the at least one second structure are assembled together.

According to a third aspect of the present disclosure, a protective case for an electronic device is provided. The protective case includes: a first structure, including a cavity suitable for accommodating the electronic device; at least one second structure, at least partially disposed opposite to the first structure, to form at least one airbag between the first structure and the second structure; and a third structure, at least partially in contact with the first structure and the at least one second structure separately, to join the first structure and the at least one second structure together by using the third structure.

In some embodiments, the first structure is formed through injection molding by using a first mold, the at least one second structure is formed through injection molding by using a second mold, the third structure is formed through injection molding by using a third mold when the first structure and the at least one second structure are assembled together, and the first mold, the second mold, and the third mold are different from each other.

In some embodiments, the first structure is made of a first material having first rigidity, the second structure is made of a second material having second rigidity, and the first rigidity is greater than the second rigidity.

In some embodiments, the airbag extends along a bezel and/or a corner region of the electronic device.

In some embodiments, one of the first structure and the second structure includes flanges that protrusively extend, the other of the first structure and the second structure includes assembly parts, and the flanges fit with the assembly parts in shape to maintain the first structure and the second structure together.

In some embodiments, the first structure includes a bottom wall and a bezel wall extending from the bottom wall, and the bezel wall includes the bezel inner surface and the opposite bezel outer surface.

In some embodiments, the flanges include a plurality of flanges extending along the bezel outer surface and protruding from the bezel outer surface, and the plurality of flanges are spaced from each other and form the airbag together with the airbag inner surface of the second structure and the bezel outer surface.

In some embodiments, the third structure extends in a manner of at least partially overlapping with the bezel wall.

In some embodiments, the first structure and the second structure form a first notch at the bottom wall and a second notch at an opening of the space, and the third structure is configured to fill the first notch and the second notch.

In some embodiments, the third structure includes a joint edge extending towards the space from the second notch and beyond the bezel wall, and the joint edge is configured to join with an edge of the electronic device.

In some embodiments, the third structure forms a flush smooth surface with the first structure and the second structure after filling the first notch and the second notch.

In some embodiments, the method further includes: filling the at least one airbag with a plurality of elastomer particles, or filling the at least one airbag with liquid and/or colloid. The filling the at least one airbag with a plurality of elastomer particles includes: filling the plurality of elastomer particles in a process of assembling the first structure and the at least one second structure together. The filling the at least one airbag with liquid and/or colloid includes: filling the airbag with the liquid and/or the colloid after the injection-molded third structure is formed through injection molding.

It should be understood that the content described in the summary is not intended to limit key or important features of embodiments of the present disclosure or limit the scope of the present disclosure. Other features of the present disclosure will be readily understood through the following description.

BRIEF DESCRIPTION OF DRAWINGS

With reference to the accompanying drawings and with reference to the following detailed descriptions, the foregoing and other features, advantages, and aspects of embodiments of the present disclosure will become more apparent. In the accompanying drawings, the same or similar reference numerals of the accompanying drawings are used to represent the same or similar elements.

DESCRIPTION OF EMBODIMENTS

The following describes embodiments of the present disclosure in more detail with reference to the accompanying drawings. Although some embodiments of the present disclosure are shown in the accompanying drawings, it should be understood that the present disclosure may be implemented in various forms, and should not be construed as being limited to the embodiments described herein. Instead, these embodiments are provided for a more thorough and complete understanding of the present disclosure. It should be understood that the accompanying drawings and embodiments of the present disclosure are merely used as examples and are not intended to limit the protection scope of the present disclosure.

In the descriptions of embodiments of the present disclosure, the term "including" and similar terms thereof shall be understood as non-exclusive inclusion, that is, "including but not limited to". The term "based on" should be understood as "at least partially based on". The term "an embodiment" or "this embodiment" should be understood as "at least one embodiment". The terms "first", "second", and the like may refer to different objects or a same object. Other explicit and implied definitions may be further included below.

Portable electronic devices such as a mobile phone and a tablet computer are prone to falling off and are damaged in a use process. A protective case for an electronic device can provide fall protection for the electronic device. The protective case can implement anti-fall by forming an airbag. The protective case is usually made of plastic, resin, or another material through injection molding. During injection molding of the protective case, the airbag is prone to being damaged under pressure, making it difficult to manufacture a satisfactory protective case provided with an airbag. For the foregoing technical problems, an embodiment of the present disclosure provides a protective case. The protective case has an improved structure and can provide an airbag with a large area. The following describes in detail, with reference to the accompanying drawings, a protective case for an electronic device according to an embodiment of the present disclosure.

FIG. 1 to FIG. 6 are schematic diagrams of structures of a protective case 100 for an electronic device according to an embodiment of the present disclosure. In the embodiment shown in FIG. 1 to FIG. 6, the electronic device is, for example, an IPHONE mobile phone manufactured by Apple Inc. It should be understood that the protective case shown in the figures is merely an example, and the protective case is applicable to any other suitable mobile phone type.

Figure 1:
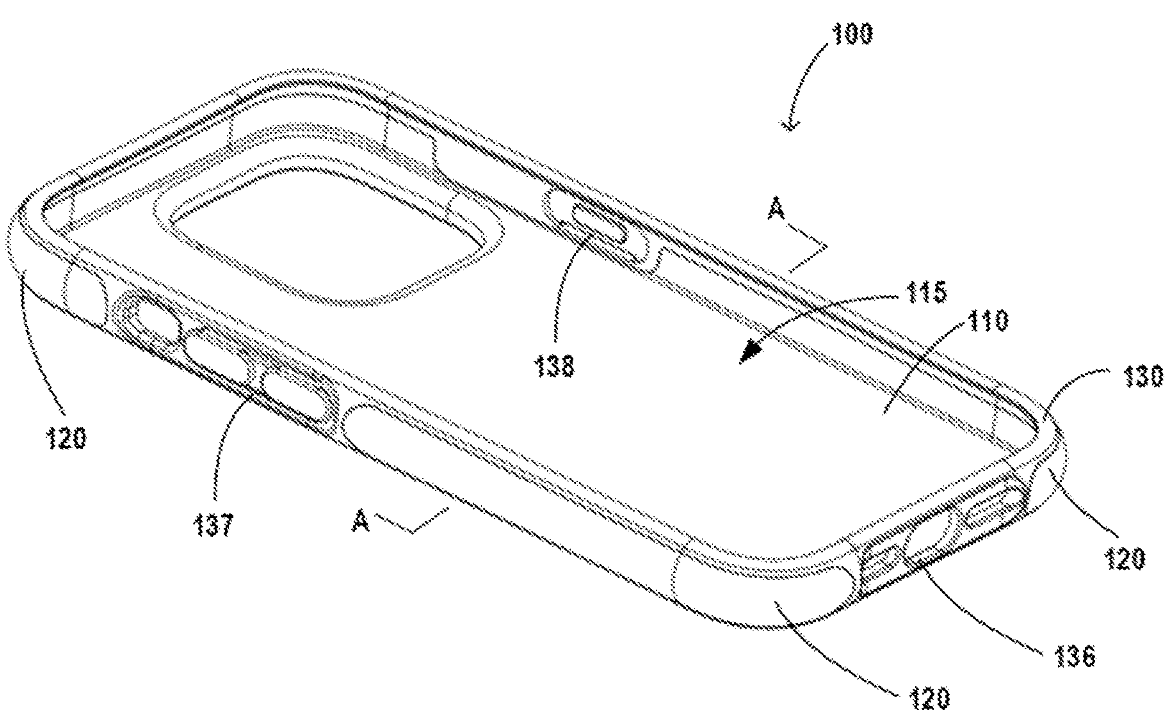
FIG. 1 is a schematic three-dimensional diagram of a protective case for an electronic device according to an embodiment of the present disclosure that is observed from an opening side.
Figure 2:
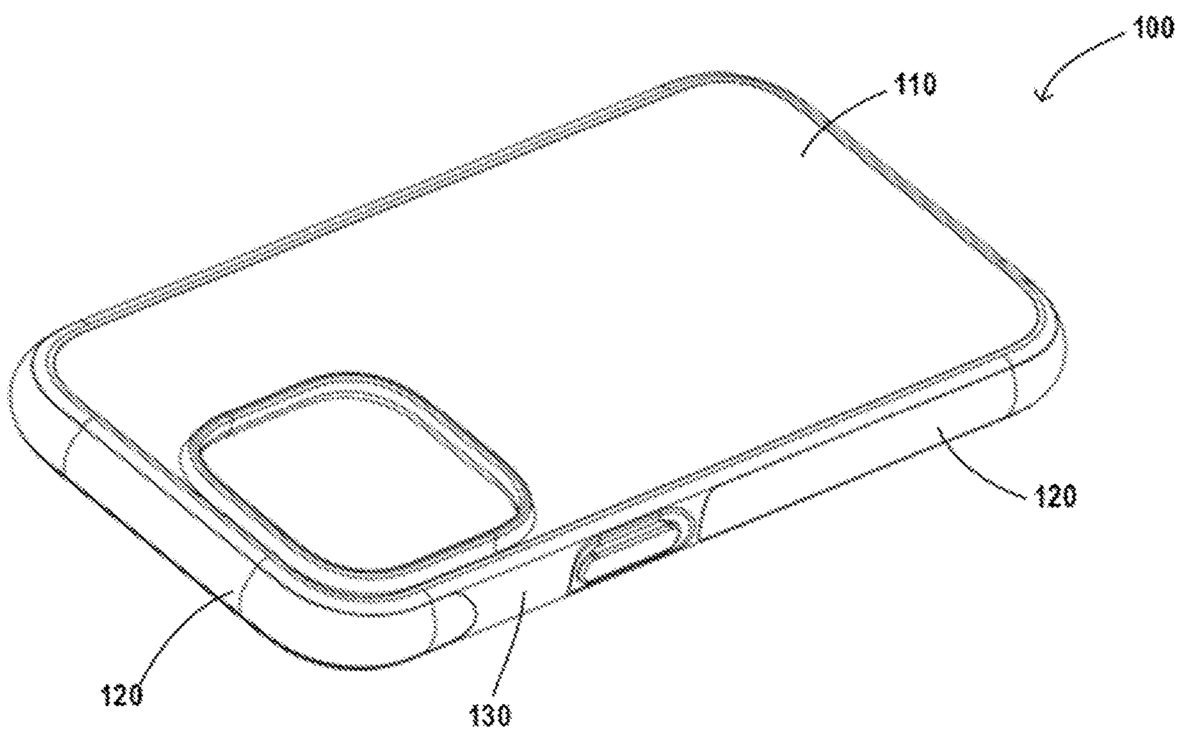
FIG. 2 is a schematic three-dimensional diagram of a protective case for an electronic device according to an embodiment of the present disclosure that is observed from a bottom side.
Figure 3:
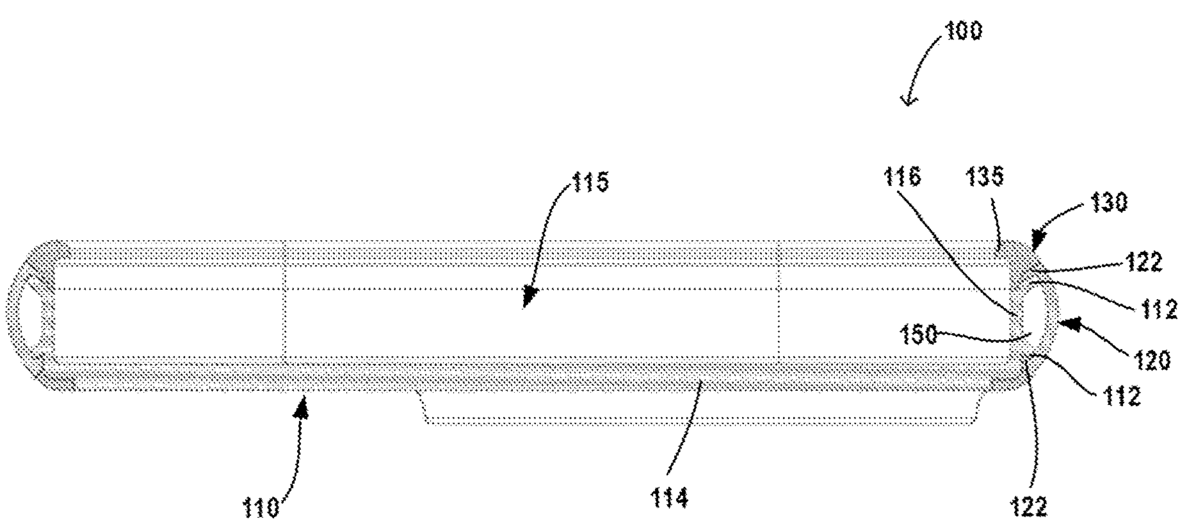
FIG. 3 is a schematic cross-sectional view of a protective case for an electronic device according to an embodiment of the present disclosure that is taken along a section line A-A in FIG. 1.
Figure 4:
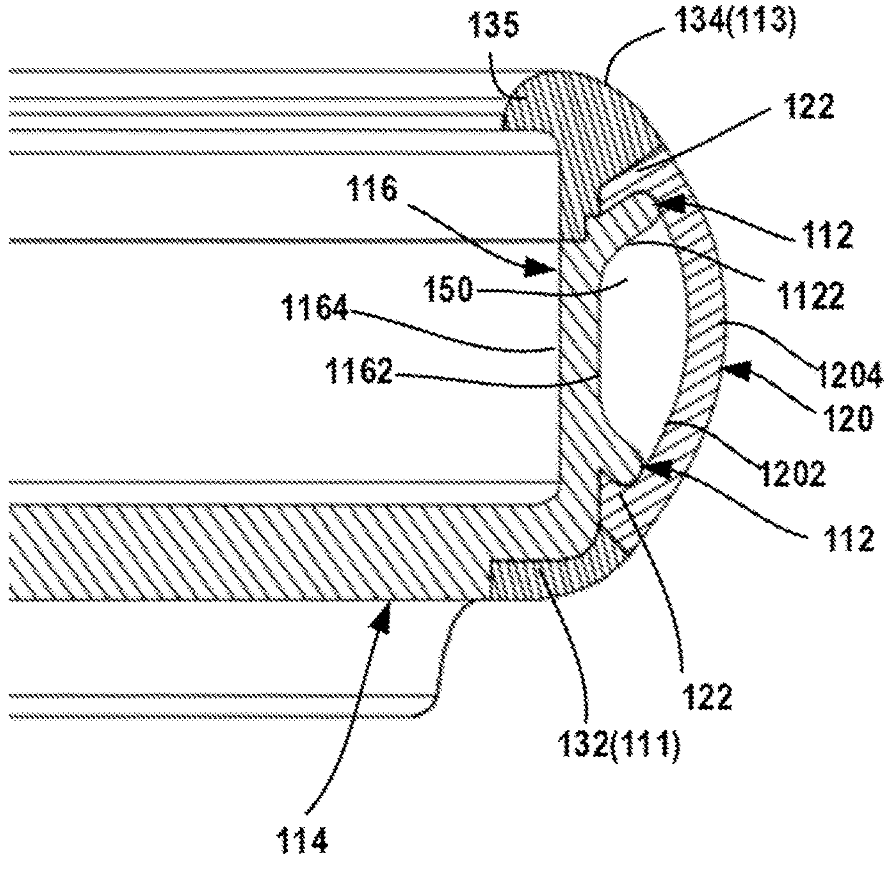
FIG. 4 is an enlarged view of a local part of the cross-sectional view shown in FIG. 3.
Figures 5, 6:
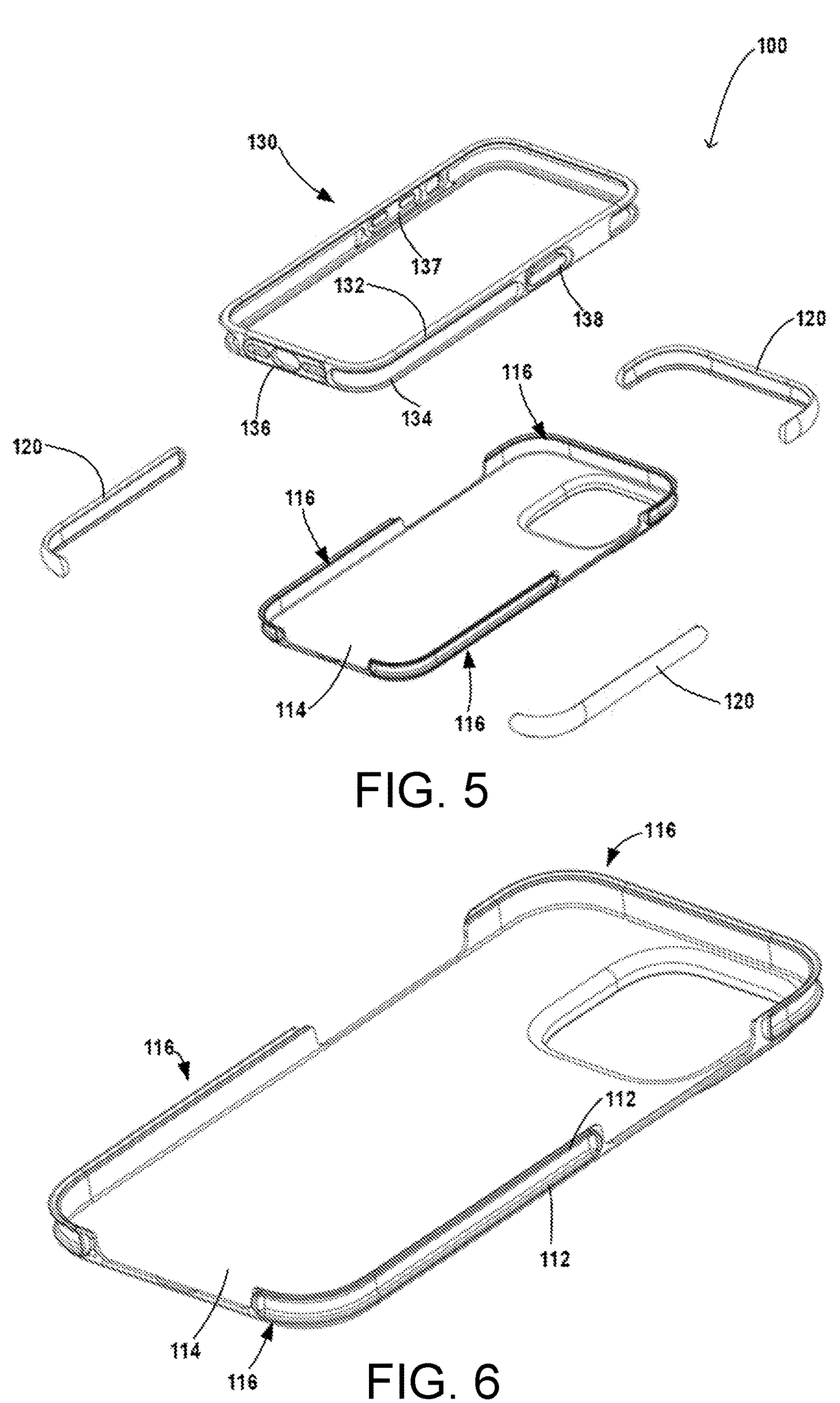
FIG. 5 is a schematic exploded view of a protective case for an electronic device according to an embodiment of the present disclosure.
FIG. 6 is a schematic diagram of a first structure according to an embodiment of the present disclosure.
Figure 7:
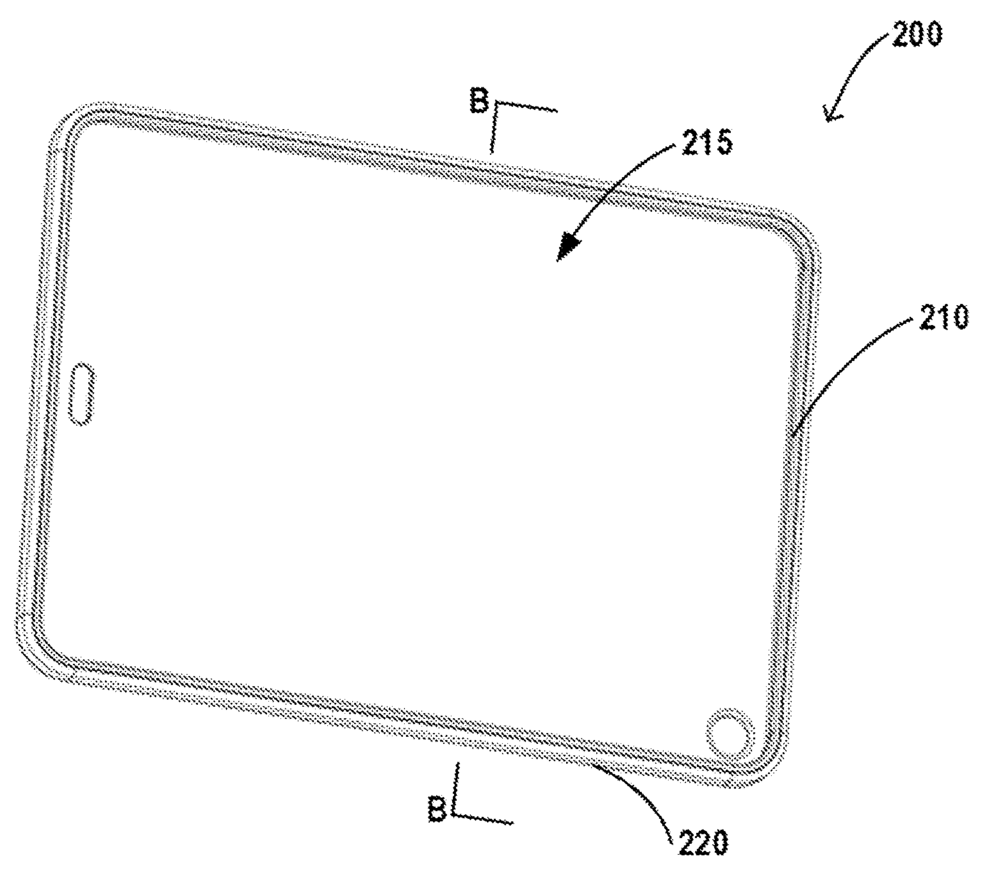
FIG. 7 is a schematic three-dimensional diagram of a protective case for an electronic device according to another embodiment of the present disclosure that is observed from an opening side.

As shown in FIG. 1 to FIG. 6, the protective case 100 may include a first structure 110. The first structure 110 may also be referred to as a basic framework body, which forms a basic framework for supporting the electronic device. The first structure 110 includes a bottom wall 114 and a bezel wall 116 extending from the bottom wall 114. The bottom wall 114 may be suitable for contacting a back surface of the electronic device, to provide the electronic device with dust prevention and anti-wear protection. The bezel wall 116 includes a bezel inner surface 1164 and a bezel outer surface 1162. An outline of the bezel inner surface 1164 may fit with an outline of a bezel of the electronic device, to enclose a space 115 suitable for accommodating the electronic device. An opening may be formed for the space 115, so that the electronic device can be placed in the space 115 through the opening. The bezel wall 116 may further include a bezel outer surface 1162 opposite to the bezel inner surface 1164 (in particular, as shown in FIG. 5). The bezel outer surface 1162 may be configured to form an airbag 150 (described later in detail).

As shown in FIG. 1 to FIG. 6, the protective case 100 may include one or more second structures 120. The second structure 120 may also be referred to as an airbag forming body. The second structure 120 extends along the bezel outer surface 1162 of the first structure 110. As shown in FIG. 1 to FIG. 6, the second structure 120 may extend along a longitudinal edge of the first structure 110 and may be joint with the first structure 110. In particular, refer to FIG. 5 and FIG. 6. The second structure 120 has an airbag inner surface 1202 and an airbag outer surface 1204. The airbag inner surface 1202 is disposed opposite to the bezel inner surface 1164. When the first structure 110 and the second structure 120 are attached to each other, one or more airbags 150 may be formed between the airbag inner surface 1202 of the second structure 120 and the bezel outer surface 1162 of the first structure 110 around an outer peripheral edge.

In some embodiments, particularly as shown in FIG. 3 to FIG. 5, the protective case 100 includes three second structures 120. The first structure 110 may include three bezel walls 116. The three second structures 120 may be respectively joint with the three bezel walls to form three airbags 150. In the protective case of this embodiment of the present disclosure, because the airbags 150 are formed along the three bezel walls 116 by using the second structures 120 and the first structure 110, regions of the airbags are significantly enlarged, thereby increasing a protection area of the electronic device.

It should be understood that shapes and a quantity of bezel walls 116 shown in the figure are merely examples. IPHONE is used as an example. Regions other than the three bezel walls 116 of the first structure 110 may be suitable for forming button interface regions 137 and 138 for operating the IPHONE, a charging interface region 136 for charging the IPHONE, or any other function regions. Another quantity of second structures and another quantity of bezel walls 116 may be disposed as required or based on outline and interface requirements of the electronic device. For example, there may be one, two, or more second structures.

The second structure 120 may be joint with the first structure 110. The first structure and the second structure may be joint with each other in a plurality of implementations. In some embodiments, after the first structure 110 and the second structure 120 are formed independently, the first structure 110 and the second structure 120 may be joint with each other through thermofussion welding. The first structure 110 and the second structure 120 can be fixedly joint with each other in the thermofussion welding manner.

In another embodiment, the first structure 110 and the second structure 120 are detachably joint with each other, for example, joint with each other in a clamping manner. For example, protrusions may be disposed on one of the first structure 110 and the second structure 120, and recesses may be disposed on the other of the first structure 110 and the second structure 120. In this way, when the first structure 110 and the second structure 120 are attached to each other, the protrusions and the recesses can be joint with each other to implement tight joint between the first structure 110 and the second structure 120. It should be understood that the protrusions and the recesses are merely examples of detachable joint, and another suitable fastening manner may alternatively be used. Through detachable joint, costs of the entire protective case can be reduced, and a user can easily replace the second structure 120 as required.

In some embodiments, after the first structure 110 and the second structure 120 are formed independently, the first structure 110 and the second structure 120 may be joint with each other by using an additional component, for example, the first structure 110 and the second structure 120 may be joint with each other by using a third structure formed through pressure injection molding. By using the third structure, airtightness of the airbag can be ensured and joint strength between the first structure 110 and the second structure 120 can be improved. Because the airbag 150 is formed by combining the bezel outer surface of the basic framework body and an inner surface of the airbag forming body, the airbag of the protective case can be formed at low costs, and a quantity and positions of airbags can be conveniently configured as required.

Because the airbag 150 is formed by combining the first structure 110 and the second structure 120, the first structure 110 and the second structure 120 may be made of different materials. This makes it possible to further improve performance of the protective case.

In some embodiments, the first structure 110 is made of a first material having first hardness, the second structure 120 is made of a second material having second hardness, and the first hardness may be greater than the second hardness. When serving as a framework support of the electronic device, the first structure 110 has high hardness and can ensure structural strength of the entire protective case. The second structure 120 serves as the airbag forming body. When the electronic device falls off, an outer surface of the second structure 120 first contacts the ground and receives a strong physical impact. When the second structure 120 has low hardness, the second structure 120 is more easily deformed when being impacted. In this way, an impact absorption effect can be further improved.

In some embodiments, the first structure 110 and the second structure 120 are made of materials suitable for injection molding. In this way, the first structure 110 and the second structure 120 can be manufactured at low costs. In some embodiments, the first structure may be made of thermoplastic/thermosetting plastic (also referred to as hard plastic), or may be made of a thermoplastic elastomer (also referred to as soft plastic). In some embodiments, the second structure may be made of a thermoplastic elastomer. Considering a flexible or soft property of the thermoplastic elastomer, this property of the second structure can be used to significantly improve anti-fall and shock absorption effects.

In some embodiments, as shown in FIG. 3 to FIG. 6, the first structure 110 may include flanges 112 or protrusive ribs that protrusively extend, and the flanges 112 may extend along the bezel outer surface of the first structure 110 and be formed at positions for forming the airbag. The second structure 120 may include assembly parts 122. In the illustrated embodiment, the assembly parts 122 are formed in forms of edges suitable for clamping. This is merely an example. The assembly parts 122 may be formed in any shape suitable for clamping with or abutting against the flanges 112. In this way, the first structure 110 and the second structure 120 can be maintained together through shape fitting. In the illustrated embodiment, there are two flanges and two assembly parts. This is merely an example. A quantity of flanges and a quantity of assembly parts each may be any other suitable quantity. In addition, in the illustrated embodiment, the flanges 112 are disposed on the first structure 110, and the assembly parts 122 are disposed on the second structure 120. This is merely an example. In another embodiment, the flanges may be disposed on the second structure, and the assembly parts may be disposed on the first structure.

In some embodiments, the flanges 112 may be further configured to form the airbag in addition to providing a joint function. As shown in FIG. 3 to FIG. 6, the flanges 112 may include a pair of flanges 112 extending along the bezel outer surface 1162 and protruding from the bezel outer surface. When the first structure 110 and the second structure 120 are joint with each other, the flanges 112 may be used to form the airbag 150 together with the airbag inner surface 1202 and the bezel outer surface 1162. For example, annular flanges 112 (as shown in FIG. 5) may be protrusively disposed along the bezel outer surface. In this way, the airbag can be disposed around the entire bezel outer surface to form the airbag with a large area. In addition, forming the airbag by using the flanges is structurally advantageous, and the flanges can further provide the airbag with specific rigidity. This is significantly advantageous in a manufacturing process of the protective case.

In some embodiments, as shown in FIG. 3 and FIG. 4, the flange 112 obliquely extends relative to the bezel outer surface when observed from a cross section of the airbag 150, so that an obtuse angle is formed between the flange 112 and the bezel inner surface 1164 forming the airbag 150. Because the flange 112 extends obliquely towards one side away from the airbag 150, rigidity of the flange 112 can be used to provide the airbag with a protection function, to prevent the airbag from being damaged or crushed in a process of forming the protective case. This is more obviously advantageous in the embodiment in which the protective case includes the third structure.

The airbag 150 may include a plurality of implementations. In some embodiments, the airbag 150 is a completely closed inflatable cavity. In some other embodiments, the airbag 150 may be a locally closed inflatable cavity. The airbag 150 may be formed in any suitable shape. In some embodiments, as shown in FIG. 3 and FIG. 4, an outer surface of the airbag 150 or the airbag outer surface 1204 of the second structure 120 may be formed in an arc shape. In this case, a shock absorption effect of the airbag 150 can be enhanced.

In some embodiments, at least one airbag may be further filled with a plurality of elastomer particles. In some embodiments, some elastomer particles are placed in an airbag region in a process of assembling the first structure 110 and the at least one second structure 120 together. This can further improve the shock absorption effect. Considering flexible and/or size characteristics of the airbag, to prevent the airbag from being crushed under a huge impact, the elastomer particles in the airbag can be used to improve shock adsorption performance of the airbag.

In some embodiments, the at least one airbag may alternatively be filled with liquid and/or colloid. In some embodiments, the airbag may be filled with liquid and/or colloid when the first structure 110 and the at least one second structure 120 are attached to each other to form a closed cavity. The liquid and/or the colloid may be used to improve the shock absorption effect. The liquid and/or the colloid may be further used in combination with a drifting sand or luminous effect, to further improve aesthetic of the protective case. In some embodiments, when the third structure is disposed, the liquid and/or the colloid may be filled after the third structure is formed.

In some embodiments, when the particles or fluid is filled, the second structure may be formed through injection molding of hard plastic.

In some embodiments, the interface regions may be disposed on the first structure 110. After the first structure 110 and the second structure 120 are separately formed by using molds, the first structure 110 and the second structure 120 may be attached together.

In some embodiments, as shown in FIG. 1 to FIG. 6, the protective case 100 may further include a third structure 130. The first structure 110 and the three second structures 120 are joint together by using the third structure 130. By providing the third structure, the first structure 110 and the second structures 120 are conveniently joint with each other, and integrity of a structure of the entire protective case is improved, thereby improving aesthetic. In addition, overall structural strength of the protective case can be improved.

In some embodiments, as shown in FIG. 3 to FIG. 5, the first structure 110 and the second structure 120 form a first notch 111 at the bottom wall 114 and a second notch 113 at an opening of the space 115. Spaces at the first notch 111 and the second notch 113 may be filled by the third structure 130. The filled regions are respectively shown as 132 and 134. Because the notches are respectively formed at the bottom wall 114 and the opening of the space 115, the third structure may be conveniently formed through over molding. In addition, the first structure 110 and the second structure 120 can be effectively covered in a manner of forming the third structure through two-sided over molding, so as to ensure structural strength between the first structure 110 and the second structure 120. This structure greatly simplifies complexity of the molds used to form the protective case. It should be understood that this is merely an example and that the notches may be formed at any other suitable positions.

In some embodiments, after the third structure 130 fills the first notch 111 and the second notch 113, the third structure 130 forms a flush smooth surface with the first structure 110 and the second structure 120. In particular, the regions 132 and 134 of the third structure 130 form the flush smooth surface with the first structure 110 and the second structure 120. This can improve aesthetic of the protective case.

In some embodiments, the third structure 130 is an injection-molded member when the first structure 110 and at least one second structure 120 are assembled together. After the first structure 110 and the second structure 120 are formed independently, the first structure 110 and the at least one second structure 120 may be assembled together, and then the third structure 130 is conveniently formed through injection molding (for example, pressure injection molding). When the third structure 130 is formed, the first structure 110 and the second structure 120 are integrated by using the third structure 130.

The third structure may be made of a material suitable for injection molding. The first structure and the second structure can be conveniently tightly joint with each other by using the third structure. In some embodiments, the third structure may be made of a same material as that of one of the first structure and the second structure. In some embodiments, the third structure may be made of thermoplastic/thermosetting plastic. In another embodiment, the third structure may alternatively be made of a thermoplastic elastomer.

Obliquely extending the flange towards the side away from the airbag is structurally advantageous in the embodiment in which the airbag 150 is formed by using the flanges 112. Specifically, when the third structure 130 is formed through injection molding, a material flow poured into a mold impacts the airbag with tremendous pressure. Because the flange obliquely extends towards the side away from the airbag, the flanges can provide structural rigidity to avoid compressing the airbag and the second structure. In this way, the third structure 130 can be conveniently formed when structural integrity of the airbag and the second structure is maintained.

In some embodiments, the third structure 130 may further include a joint edge 135 extending towards the space 115 from the second notch 113 and beyond the bezel wall. The joint edge is configured to join with an edge of the electronic device. In this way, the joint edge can be tightly maintained. In this manner, the joint edge can be provided by using the third structure 130. In this way, complexity of the molds used to manufacture the protective case is simplified.

In some embodiments, as shown in FIG. 4, the third structure 130 extends in a manner of at least partially overlapping with the bezel wall 116 of the first structure 110. This is significantly advantageous during injection molding of the third structure. In particular, when the third structure 130 is formed through injection molding, pressure of the fluid used to form the third structure 130 can be effectively supported by using rigidity provided by the bezel wall 116, thereby preventing excessive impact pressure on the pre-formed airbag 150.

In some embodiments, the third structure 130 is partially in contact with an outer surface of the assembly part 122 of the second structure 120. In this case, it can be ensured that when the third structure 130 is formed, the third structure 130 can have a sufficient contact area with the first structure and the second structure, thereby implementing sufficient joint strength.

In some embodiments, the third structure 130 may further include interface regions 136, 137, and 138 for operating the electronic device. According to this embodiment of the present disclosure, the interface regions 136, 137, and 138 can be conveniently formed on the third structure 130 rather than on the first structure 110. In this way, the complexity of the molds used to manufacture the protective case is simplified. As shown in FIG. 5, the regions 132 and 134 of the third structure 130 may be formed integrally with the interface regions 136, 137, and 138 through injection molding.

In some embodiments, the third structure 130 may be made of a material having third hardness. The third hardness may be less than the first hardness. In this case, for example, flexibility of operating the button region can be improved. It should be understood that this is merely an example and that the third structure 130 may be made of any other suitable material through injection molding.

FIG. 7 to FIG. 10 are schematic diagrams of a protective case 200 for an electronic device according to another embodiment of the present disclosure. The protective case 200 shown in FIG. 7 to FIG. 10 is similar to the protective case 100 shown in FIG. 1 to FIG. 6. For example, the electronic device is an IPAD.

As shown in FIG. 7 to FIG. 10, the protective case 200 may include a first structure 210 and a second structure 220. The first structure 210 forms a basic framework for supporting the electronic device. The first structure 210 includes a bottom wall 214 and a bezel wall 216 extending from the bottom wall 214. The bottom wall 214 may be suitable for contacting a back surface of the electronic device, to provide the electronic device with dust prevention and anti-wear protection. The bezel wall 216 includes a bezel inner surface 2164 and a bezel outer surface 2162. An outline of the bezel inner surface 2164 may fit with an outline of a bezel of the electronic device, to enclose a space 215 suitable for accommodating the electronic device. An opening may be formed for the space 215, so that the electronic device can be placed in the space 215 through the opening. The bezel wall 216 may further include a bezel outer surface 2162 opposite to the bezel inner surface 2164. The bezel outer surface 2162 may be configured to form airbags 250.

The second structure 220 may also be referred to as an airbag forming body. The second structure 220 extends along the bezel outer surface 2162 of the first structure 210 and may be joint with the first structure 110. The second structure 220 has an airbag inner surface 2202 and an airbag outer surface 2204. The airbag inner surface 2202 is disposed opposite to the bezel inner surface 2164. When the first structure 210 and the second structure 220 are attached to each other, a plurality of airbags 250 are formed between the airbag inner surface 2202 of the second structure 220 and the bezel outer surface 2162 of the first structure 210.

In some embodiments, the protective case 200 includes a second structure 120. In this way, the first structure 210 and the second structure 120 can be used to form continuous airbags around an outer peripheral edge.

The second structure 220 may be joint with the first structure 210. The first structure and the second structure may be joint with each other in a plurality of implementations. In some embodiments, after the first structure 210 and the second structure 220 are formed independently, the first structure 210 and the second structure 220 may be joint with each other through thermofussion welding. In some embodiments, after the first structure 210 and the second structure 220 are formed independently, the first structure 210 and the second structure 220 may be joint with each other by using an additional component, for example, the first structure 210 and the second structure 220 may be joint with each other by using a third structure formed through pressure injection molding.

In some embodiments, the first structure 210 is made of a first material having first hardness, the second structure 220 is made of a second material having second hardness, and the second hardness may be greater than the first hardness. When serving as a framework support of the electronic device, the first structure 210 has high hardness and can ensure structural strength of the entire protective case. The second structure 220 serves as the airbag forming body. When the electronic device falls off, an outer surface of the second structure 220 first contacts the ground and receives a strong physical impact. When the second structure 220 has low hardness, the second structure 220 is more easily deformed when being impacted. In this way, an impact absorption effect can be further improved.

In some embodiments, as shown in FIG. 7 to FIG. 10, the first structure 210 may include flanges 212 and 214 that protrusively extend, and the flanges 212 and 214 may extend along the bezel outer surface of the first structure 210 and be formed at positions for forming the airbags. The second structure 220 may include assembly parts 222. In the illustrated embodiment, the assembly parts 222 are formed in forms of edges suitable for clamping with the flanges 212. This is merely an example. The assembly parts 222 may be formed in any shape suitable for clamping with or abutting against the flanges 212. In this way, the first structure 210 and the second structure 220 can be maintained together through shape fitting. In the illustrated embodiment, there are two flanges and two assembly parts. This is merely an example. A quantity of flanges and a quantity of assembly parts each may be any other suitable quantity.

In some embodiments, the flanges 212 may be further configured to form the airbags. As shown in FIG. 7 to FIG. 10, the flanges 212 may include three flanges 212 and 214 extending along the bezel outer surface 2162 and protruding from the bezel outer surface. The flanges 212 and 214 are spaced from each other and form the airbags 250 together with the airbag inner surface 2202 and the bezel outer surface 2162. In this manner, structural complexity of the protective case can be minimized. In addition, forming the airbags by using the flanges is structurally advantageous, and the flanges can further provide the airbags with specific rigidity. This is significantly advantageous in a manufacturing process of the protective case.

In some embodiments, as shown in FIG. 7 to FIG. 10, the flanges 212 and 214 extend vertically relative to the bezel outer surface when observed from a cross section of the airbags 250. Rigidity of the flanges 212 and 214 can provide the airbags with a protection function, so as to prevent the airbags from being damaged or crushed in a process of forming the protective case. This is more obviously advantageous in the embodiment in which the protective case includes the third structure.

Figure 8:
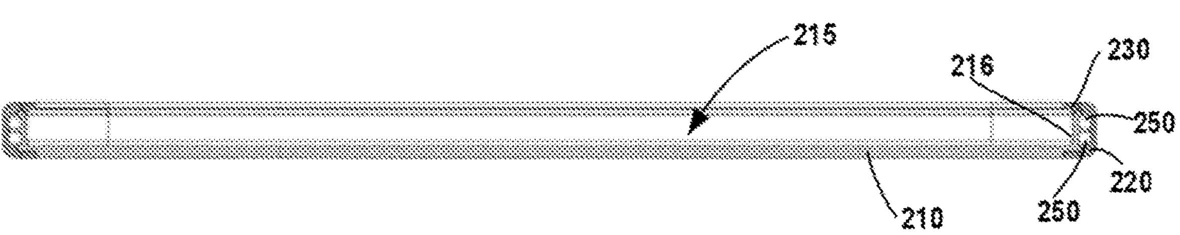
FIG. 8 is a schematic cross-sectional view of a protective case for an electronic device according to another embodiment of the present disclosure that is taken along a section line B-B in FIG. 7.
Figure 9:
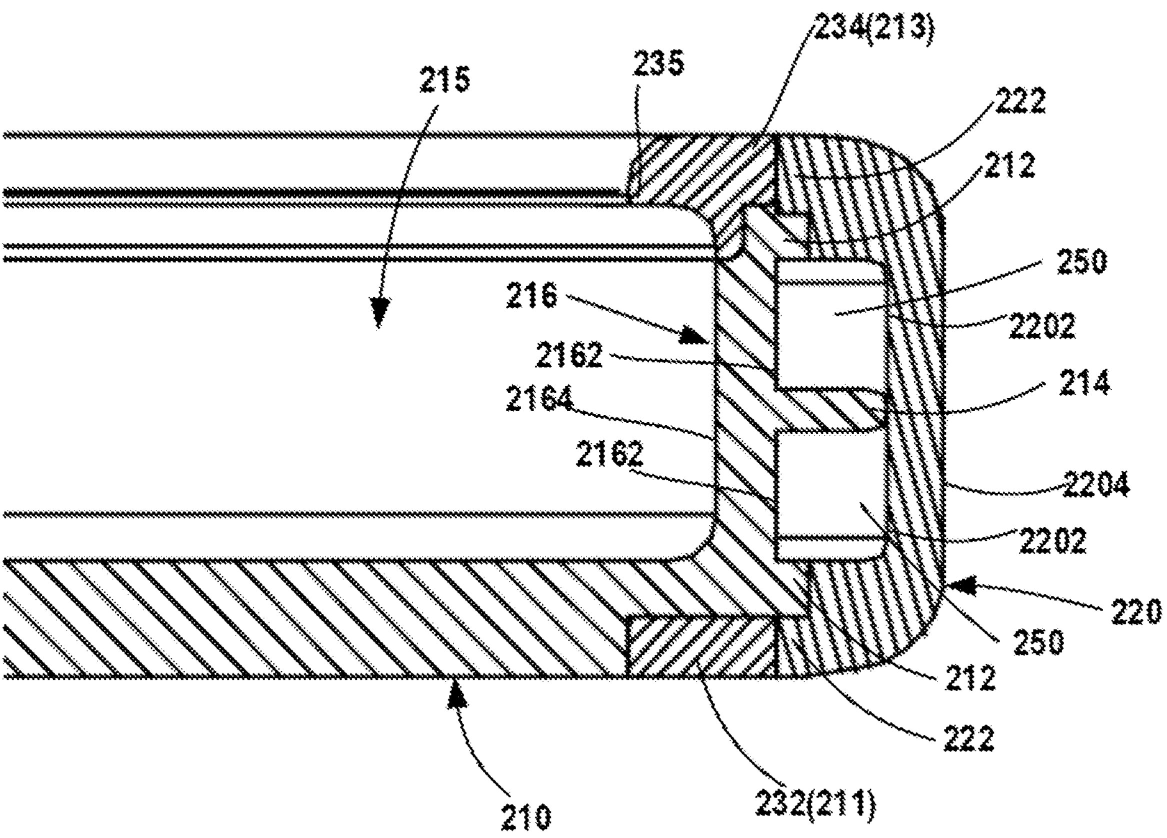
FIG. 9 is an enlarged view of a local part of the cross-sectional view shown in FIG. 8.
Figure 10:
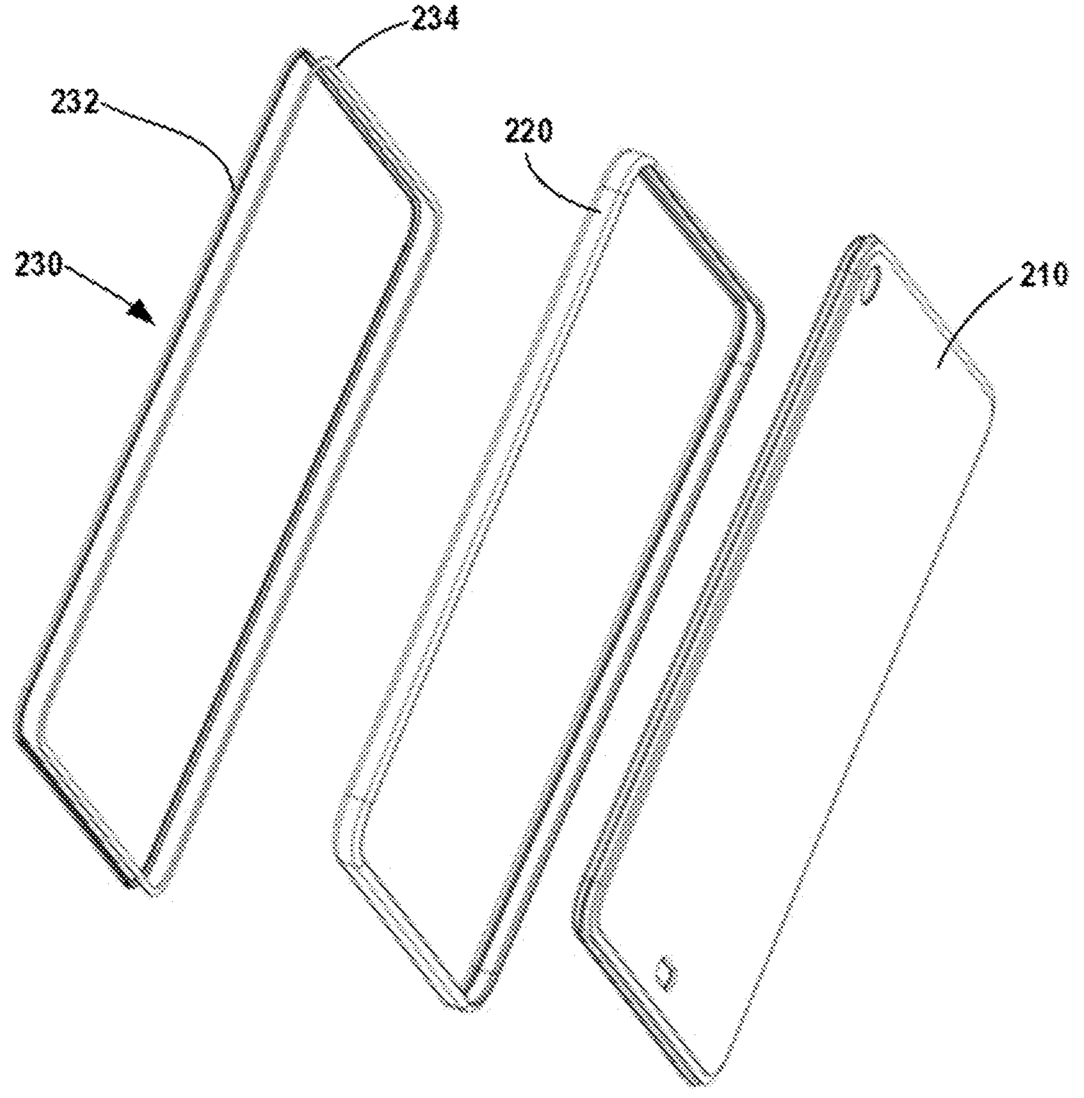
FIG. 10 is a schematic exploded view of a protective case for an electronic device according to another embodiment of the present disclosure.

The airbag 250 may include a plurality of implementations. In some embodiments, the airbag 250 is a completely closed inflatable cavity. In some other embodiments, the airbag 150 may be a locally closed inflatable cavity. The airbag 150 may be formed in any suitable shape. In some embodiments, as shown in FIG. 8 and FIG. 9, an outer surface of the airbag 150 or the airbag outer surface 1204 of the second structure 120 may be formed in a straight-line shape. In this case, rigidity of the airbag 150 can be enhanced.

In some embodiments, interface regions may be disposed on the first structure 210. After the first structure 210 and the second structure 220 are separately formed by using molds, the first structure 210 and the second structure 220 may be attached together.

In some embodiments, as shown in FIG. 7 to FIG. 10, the protective case 100 may further include a third structure 230. The first structure 210 and three second structures 220 are joint together by using the third structure 230. By providing the third structure, the first structure 210 and the second structures 220 are conveniently joint with each other, and integrity of a structure of the entire protective case is improved, thereby improving aesthetic. In addition, overall structural strength of the protective case can be improved.

In some embodiments, as shown in FIG. 7 to FIG. 10, the first structure 210 and the second structure 220 form a first notch 211 at the bottom wall 214 and a second notch 213 at an opening of the space 215. Spaces at the first notch 211 and the second notch 213 may be filled by the third structure 230. The filled regions are shown by reference numerals 232 and 234. Because the notches are respectively formed at the bottom wall 214 and the opening of the space 215, the third structure may be conveniently formed through over molding. In addition, the first structure 210 and the second structure 220 can be effectively covered in a manner of forming the third structure through two-sided over molding, so as to ensure structural strength between the first structure 210 and the second structure 220. This structure greatly simplifies complexity of molds used to form the protective case. It should be understood that this is merely an example and that the notches may be formed at any other suitable positions.

In some embodiments, after the third structure 230 fills the first notch 211 and the second notch 213, the third structure 230 forms a flush smooth surface with the first structure 210 and the second structure 220. In particular, the regions 232 and 234 form a flush smooth surface with the first structure 210 and the second structure 220. This can improve aesthetic of the protective case. In some embodiments, the regions 232 and 234 may implement sealing of cavities of the airbags 250.

In some embodiments, the third structure 230 is an injection-molded member when the first structure 210 and the second structure 220 are assembled together. After the first structure 210 and the second structure 220 are formed independently, the first structure 210 and the at least one second structure 220 may be assembled together, and then the third structure 130 is conveniently formed through injection molding (for example, pressure injection molding). When the third structure 130 is formed, the first structure 110 and the second structure 120 are integrated by using the third structure 130.

In some embodiments, the third structure 230 may further include a joint edge 235 extending towards the space 215 from the second notch 213 and beyond the bezel wall. The joint edge is configured to join with an edge of the electronic device. In this way, the joint edge can be tightly maintained. In this manner, the joint edge can be provided by using the third structure 130. In this way, complexity of the molds used to manufacture the protective case is simplified.

In some embodiments, as shown in FIG. 9, the third structure 230 extends in a manner of at least partially overlapping with the bezel wall 216 of the first structure 210. This is significantly advantageous during injection molding of the third structure. In particular, when the third structure 230 is formed through injection molding, pressure of fluid used to form the third structure 230 can be effectively supported by using rigidity provided by the bezel wall 216, thereby preventing excessive impact pressure on the pre-formed airbags 250.

In some embodiments, the third structure 230 is partially in contact with an outer surface of an assembly part 222 of the second structure 210. In this case, it can be ensured that when the third structure 230 is formed, the third structure 230 can have a sufficient contact area with the first structure and the second structure, thereby implementing sufficient joint strength.

Figure 11:
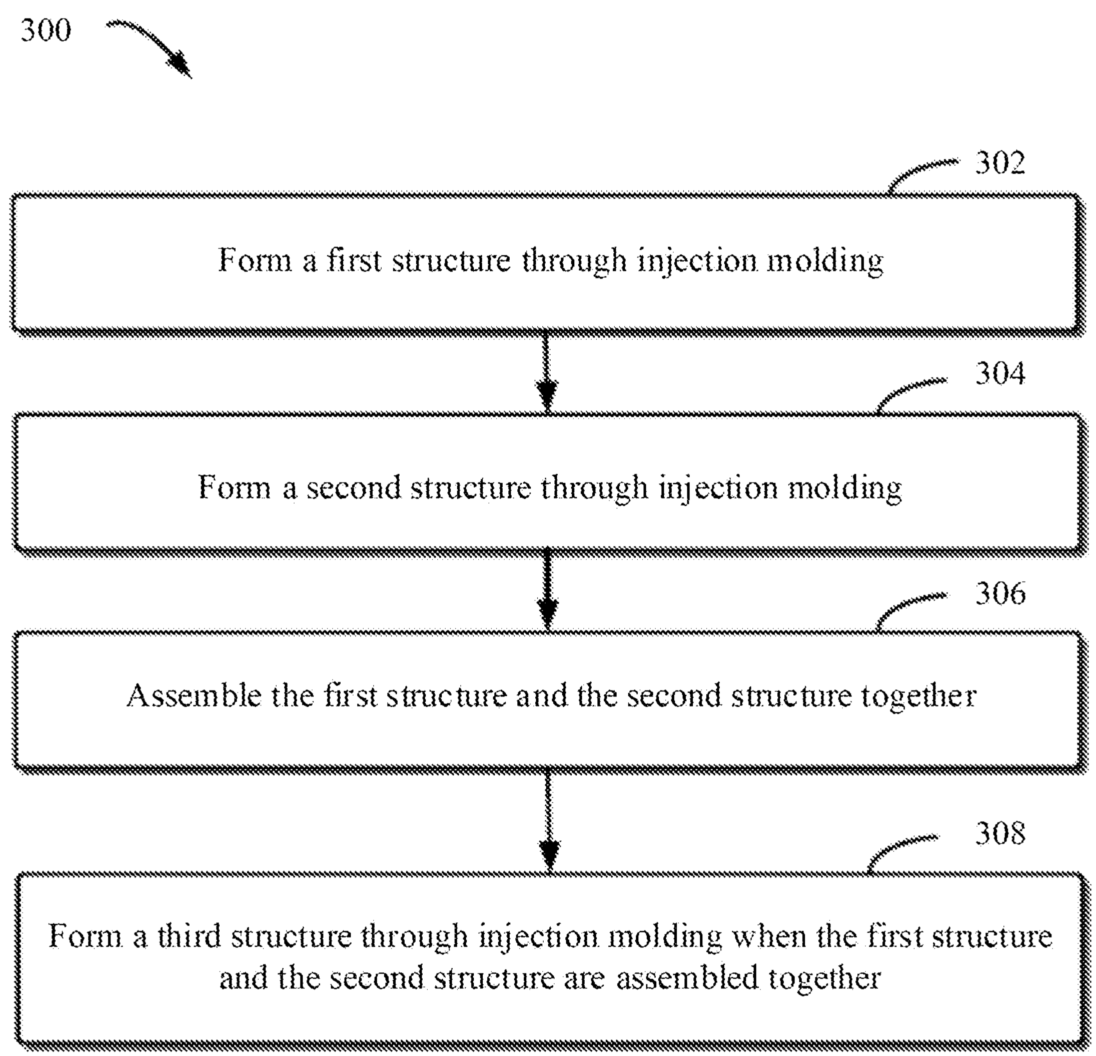
FIG. 11 is a flowchart of a protective case manufacturing method according to the present disclosure.

According to another aspect of the present disclosure, a protective case manufacturing method 300 is further provided. As shown in FIG. 11, the method 300 may include the following actions. In a block 302, a first structure is manufactured. The first structure has a bezel inner surface and a bezel outer surface, and the bezel inner surface encloses a space suitable for accommodating an electronic device. In a block 304, one or more second structures are manufactured. The second structure extends along the bezel outer surface and has an airbag inner surface and an airbag outer surface. In a block 306, the first structure and the at least one second structure are assembled together. When the first structure and the at least one second structure are assembled together, the airbag inner surface is disposed opposite to the bezel inner surface, to form at least one airbag between the airbag inner surface and the bezel outer surface. In a block 308, when the first structure and the at least one second structure are assembled together, the third structure is formed through injection molding. The third structure is formed through injection molding, so that the first structure and the at least one second structure are joint together by using the third structure.

According to the method in this embodiment of the present disclosure, the first structure and the second structure are formed independently and the third structure is formed through injection molding when the first structure and the at least one second structure are assembled together, thereby conveniently forming an air bag with a large protection area.

In some embodiments, the first structure is formed through injection molding by using a first mold, the at least one second structure is formed through injection molding by using a second mold, and the third structure is formed through injection molding by using a third mold when the first structure and the at least one second structure are assembled together. The first structure and the second structure are independently formed by using a plurality of molds, and the third structure is formed through injection molding by using the third mold when the first structure and the at least one second structure are assembled together, thereby simplifying complexity of the molds and manufacturing the protective case at low costs.

According to another aspect of the present disclosure, a protective case for an electronic device is further provided. The protective case has the following features.

In addition, although operations are described in a particular order, it should be understood as that it is required that the operations are performed in the shown particular order or in sequence, or it is required that all operations shown in the figures should be performed to achieve an expected result. In a specific environment, multi-tasking and parallel processing may be advantageous. Similarly, although several specific implementation details are included in the foregoing description, these should not be construed as limiting the scope of the present disclosure. Some features described in the context of an individual embodiment may alternatively be implemented in combination in a single implementation. On the contrary, various features described in the context of a single implementation may alternatively be implemented in a plurality of implementations individually or in any suitable sub-combination.

Although the subject matter is described in a language specific to structural features and/or method logic actions, it should be understood that the subject matter defined in the appended claims is not necessarily limited to the particular features or actions described above. On the contrary, the particular features and actions described above are merely example forms for implementing the claims.

What is claimed is:

1. A protective case for an electronic device, comprising:

a first structure, having a bezel inner surface and a bezel outer surface, wherein the bezel inner surface encloses a space suitable for accommodating the electronic device; and at least one second structure, attached to the first structure, wherein the at least one second structure extends along the bezel outer surface and has an airbag inner surface and an airbag outer surface, and the airbag inner surface is disposed opposite to the bezel inner surface, to form at least one airbag between the airbag inner surface and the bezel outer surface; wherein the first structure is made of a first material having first hardness, the at least one second structure is made of a second material having second hardness, and the first hardness is greater than the second hardness;

one of the first structure and the at least one second structure comprises flanges that protrusively extend, the other of the first structure and the at least one second structure comprises assembly parts, and the flanges fit with the assembly parts in shape to maintain the first structure and the at least one second structure together;

the flanges comprise a plurality of flanges extending along the bezel outer surface and protruding from the bezel outer surface, the plurality of flanges are spaced from each other and form the at least one airbag together with the airbag inner surface and the bezel outer surface; and the flange perpendicularly or obliquely extends relative to the bezel outer surface when observed from a cross section of the at least one airbag, so that a right angle or an obtuse angle is formed between the flange and the bezel outer surface forming the at least one airbag.

2. The protective case according to claim 1, further comprising a third structure, wherein the first structure and the at least one second structure are joint together by using the third structure.

3. The protective case according to claim 2, wherein the first structure comprises a bottom wall and a bezel wall extending from the bottom wall, and the bezel wall comprises the bezel inner surface and the bezel outer surface.

4. The protective case according to claim 3, wherein the first structure and the at least one second structure form a first notch at the bottom wall and a second notch at an opening of the space, and the third structure is configured to fill the first notch and the second notch.

5. The protective case according to claim 4, wherein the third structure comprises a joint edge extending towards the space from the second notch and beyond the bezel wall, and the joint edge is configured to join with an edge of the electronic device.

6. The protective case according to claim 5, wherein the third structure is an injection-molded member when the first structure and the at least one second structure are assembled together.

7. The protective case according to claim 2, wherein the third structure further comprises interface regions suitable for operating the electronic device.

8. The protective case according to claim 3, wherein the third structure is an injection-molded member when the first structure and the at least one second structure are assembled together.

9. The protective case according to claim 4, wherein the third structure is an injection-molded member when the first structure and the at least one second structure are assembled together.

10. The protective case according to claim 1, wherein the at least one airbag further comprises a plurality of elastomer particles accommodated in the at least one airbag; or the at least one airbag further comprises liquid and/or colloid filled in the at least one airbag.

11. A protective case manufacturing method, comprising:

forming a first structure through injection molding, wherein the first structure has a bezel inner surface and a bezel outer surface, and the bezel inner surface encloses a space suitable for accommodating an electronic device;

forming at least one second structure through injection molding, wherein the at least one second structure extends along the bezel outer surface and has an airbag inner surface and an airbag outer surface;

assembling the first structure and the at least one second structure together, so that the airbag inner surface is disposed opposite to the bezel inner surface, to form at least one airbag between the airbag inner surface and the bezel outer surface;

forming a third structure through injection molding when the first structure and the at least one second structure are assembled together, so that the first structure and the at least one second structure are joint together by using the third structure;

filling the at least one airbag with a plurality of elastomer particles, or filling the at least one airbag with liquid and/or colloid; wherein filling the at least one airbag with a plurality of elastomer particles comprises: filling the plurality of elastomer particles in a process of assembling the first structure and the at least one second structure together; and filling the at least one airbag with liquid and/or colloid comprises: filling the at least one airbag with the liquid and/or colloid after the third structure is formed through injection molding.

12. The method according to claim 11, wherein the first structure is formed through injection molding by using a first mold, the at least one second structure is formed through injection molding by using a second mold, and the third structure is formed through injection molding by using a third mold when the first structure and the at least one second structure are assembled together.

13. The method according to claim 12, further comprising: filling the at least one airbag with a plurality of elastomer particles, or filling the at least one airbag with liquid and/or colloid, wherein the filling the at least one airbag with the plurality of elastomer particles comprises: filling the plurality of elastomer particles in a process of assembling the first structure and the at least one second structure together; and the filling the at least one airbag with liquid and/or colloid comprises: filling the at least one airbag with the liquid and/or the colloid after the third structure is formed through injection molding.

* * * * *